United States Patent
Yokota et al.

(10) Patent No.: US 11,194,685 B2
(45) Date of Patent: Dec. 7, 2021

(54) RECORDING MEDIUM FOR VERIFYING CORRELATION BETWEEN TEST SIGNAL AND TEST RESULT SIGNAL, VERIFICATION APPARATUS AND VERIFICATION METHOD

(71) Applicant: Yokogawa Electric Corporation, Tokyo (JP)

(72) Inventors: Yusuke Yokota, Tokyo (JP); Ryouhei Furihata, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 20 days.

(21) Appl. No.: 16/525,626

(22) Filed: Jul. 30, 2019

(65) Prior Publication Data

US 2020/0034261 A1 Jan. 30, 2020

(30) Foreign Application Priority Data

Jul. 30, 2018 (JP) .............................. JP2018-142124

(51) Int. Cl.
*G06F 11/26* (2006.01)
*G05B 19/418* (2006.01)
*G05B 23/02* (2006.01)

(52) U.S. Cl.
CPC .......... *G06F 11/26* (2013.01); *G05B 19/4184* (2013.01); *G05B 23/0256* (2013.01); *G05B 2219/32406* (2013.01)

(58) Field of Classification Search
CPC ........ G05B 21/00; G05B 21/07; G05B 23/00; G05B 23/02–0256; Y10S 715/97;
(Continued)

(56) References Cited

U.S. PATENT DOCUMENTS 4,499,756 A * 2/1985 Medeiros ................ F01D 21/20
60/660
9,934,671 B1 * 4/2018 Anderson .............. G08B 21/18
(Continued)

FOREIGN PATENT DOCUMENTS

| JP | 2009169882 A | 7/2009 |
| JP | 2014081708 A | 5/2014 |
| JP | 2017191386 A | 10/2017 |

OTHER PUBLICATIONS

Understanding Differential Pressure Flow Transmitters by David Spitzer published Oct. 20, 2008 https://www.valvemagazine.com/magazine/sections/beyond-valves/4382-understanding-differential-pressure-flow-transmitters.html (Year: 2008).*

(Continued)

*Primary Examiner* — Joseph O Schell (57) ABSTRACT

Provided is a recording medium having a verification program recorded thereon, wherein the verification program is executed by computer and causes the computer to function as: a test information acquisition unit which acquires test information showing a test signal generated by a field device installed in a plant; a result information acquisition unit which acquires result information showing a test result signal output by a monitor device installed in the plant in response to the field device generating the test signal; and a verification unit which verifies, based on the test information and the result information, whether or not a relationship is established between the test signal and the test result signal, the relationship depending on a performed change of a signal that is generated by the field device and output from the monitor device before the signal is output from a monitor device.

7 Claims, 6 Drawing Sheets

(58) Field of Classification Search
CPC .. Y10S 715/964; Y10S 715/965; G06F 11/26; G01M 15/106; G01M 15/108; G01M 3/02; G01M 3/04; F02C 9/16; F02C 9/20; F02C 9/24; F02C 9/28; B66F 9/20; B66F 9/07509; B66F 9/07581
See application file for complete search history.

(56) References Cited

U.S. PATENT DOCUMENTS

| | | | |
|---|---|---|---|
| 2005/0274417 A1 | 12/2005 | Perry | |
| 2007/0043539 A1* | 2/2007 | Niina | G05B 23/0254 702/188 |
| 2007/0276628 A1 | 11/2007 | Hashemian | |
| 2008/0066004 A1* | 3/2008 | Blevins | G06F 9/4488 715/771 |
| 2010/0299122 A1* | 11/2010 | Golinveaux | G06F 30/20 703/9 |
| 2011/0178612 A1 | 7/2011 | Nakatani | |
| 2013/0080100 A1* | 3/2013 | Wang | G05B 23/0208 702/85 |
| 2015/0227117 A1* | 8/2015 | Hampton | G05B 23/0256 700/79 |
| 2017/0293544 A1 | 10/2017 | Katayama | |
| 2018/0127957 A1* | 5/2018 | Enev | E03B 7/003 |
| 2018/0210429 A1* | 7/2018 | Jundt | H04L 67/12 |
| 2020/0033894 A1* | 1/2020 | Kobayashi | F16K 1/304 |

OTHER PUBLICATIONS

Office Action issued for counterpart Japanese Application No. 2018-142124, issued by the Japanese Patent Office dated Oct. 29, 2019 (drafted on Oct. 15, 2019).

Extended European Search Report for counterpart European Application No. 19188830.4, issued by the European Patent Office dated Dec. 19, 2019.

* cited by examiner

RECORDING MEDIUM FOR VERIFYING CORRELATION BETWEEN TEST SIGNAL AND TEST RESULT SIGNAL, VERIFICATION APPARATUS AND VERIFICATION METHOD

The contents of the following Japanese patent application(s) are incorporated herein by reference:
2018-142124 filed in JP on Jul. 30, 2018

BACKGROUND

1. Technical Field

The present invention relates to a recording medium having a verification program recorded thereon, a verification apparatus and a verification method.

2. Related Art

Conventionally, when a loop test of a plant is conducted, a worker and the like causes a field device, which is installed in the plant, to generate a test signal and compares the test signal generated by the field device against a test result signal output through a monitor device of a manipulation/monitoring device or the like, which is installed in the plant, thereby confirming whether the plant passes/fails the test.

SUMMARY

Between the field device and the monitor device, various kinds of equipment are installed and various controls are performed. For this reason, the effects by the various kinds of equipment and the various controls, the worker sometimes cannot determine whether the plant passes/fails the test simply by comparing the test signal generated by the field device and the test result signal output by the monitor device installed in the plant.

In a first aspect of the present invention, a recording medium having a verification program recorded thereon is provided in order to resolve the above-mentioned problem. The recording medium may record a verification program which is executed by computer. The verification program may be executed by the computer. The verification program may cause the computer to function as a test information acquisition unit which acquires the test information showing the test signal that is generated by the field device that is installed in the plant. The verification program may cause the computer to function as a result information acquisition unit which acquires the result information showing a test result signal that is output by the monitor device installed in the plant in response to the test signal having generated by the field device. The verification program may cause the computer to function as a verification unit which verifies, based on the test information and the result information, whether or not a relationship is established between the test signal and the test result signal, the relationship depending on the performed change of a signal that is generated by the field device and output from the monitor device before the signal is output from the monitor device.

The verification unit may perform an opposite change in the opposite direction to the change in the test result signal, and may verify whether or not a relationship is established, the relationship depending on the change, based on the test result signal having the opposite change performed therein and the test signal.

The verification unit may perform a same change in the same direction with the change performed in the test signal, may verify whether or not a relationship is established, the relationship depending on the change, based on the test signal having the same change is performed therein and the test result signal.

When a predetermined operation is performed on the signal generated by the field device before the signal is output from the monitor device, the verification unit may verify whether or not a relationship is established, the relationship depending on the change, based on the test signal, the test result signal and information of the operation.

When an operation is performed based on another signal performed on the signal generated by the field device before the signal is output from the monitor device, the verification unit may verify whether or not a relationship is established, the relationship depending on the change, based on the test signal, the test result signal and the another signal.

When a selection is made from a plurality of options based on the signal generated by the field device before the signal is output from the monitor device, the verification unit may verify whether or not a relationship is established, the relationship depending on the change, based on the test signal, the test result signal and the information of the selection.

The test information includes equipment information to identify the field device that has generated the test signal, and the verification unit may verify whether or not a relationship is established between the test signal and the test result signal, the relationship depending on the change corresponding to the equipment information.

At least one of the test information and the result information may include clock time information.

In order to resolve the above-mentioned problem, a second aspect of the present invention provides a verification apparatus. The verification apparatus may comprise a test information acquisition unit which acquires test information showing the test signal generated by the field device installed in the plant. The verification apparatus may comprise a result information acquisition unit which acquires result information showing the test result signal output by the plant in response to the test signal having been generated by the field device. The verification apparatus may comprise a verification unit which verifies, based on the test information and result information, whether or not a relationship is established between the test signal and the test result signal, the relationship depending on the performed change of a signal that is generated by the field device before the signal is output from the plant.

In order to resolve the above-mentioned, a third aspect in the present invention provides a verification method. The verification method may comprise acquiring, by the verification apparatus, the test information showing the test signal generated by the field device installed in the plant. The verification method may comprise acquiring, by the verification apparatus, the result information showing the test result signal output by the monitor device installed in the plant in response to a field device generating the test signal. The verification method may comprise verifying, by the verification apparatus, based on the test information and the result information, whether or not a relationship is established between the test signal and the test result signal, the relationship depending on the performed change of a signal that is generated by the field device and output from the monitor device before the signal is output from the monitor device.

The summary clause does not necessarily describe all necessary features of the embodiments of the present invention. The present invention may also be a sub-combination of the features described above.

DESCRIPTION OF EXEMPLARY EMBODIMENTS

Hereinafter, the present invention will be described with reference to embodiments of the invention. However, the following embodiments should not to be construed as limiting the claimed invention. Also, all the combinations of the features described in the embodiment(s) are not necessarily essential for means provided by aspects of the invention.

Figure 1:
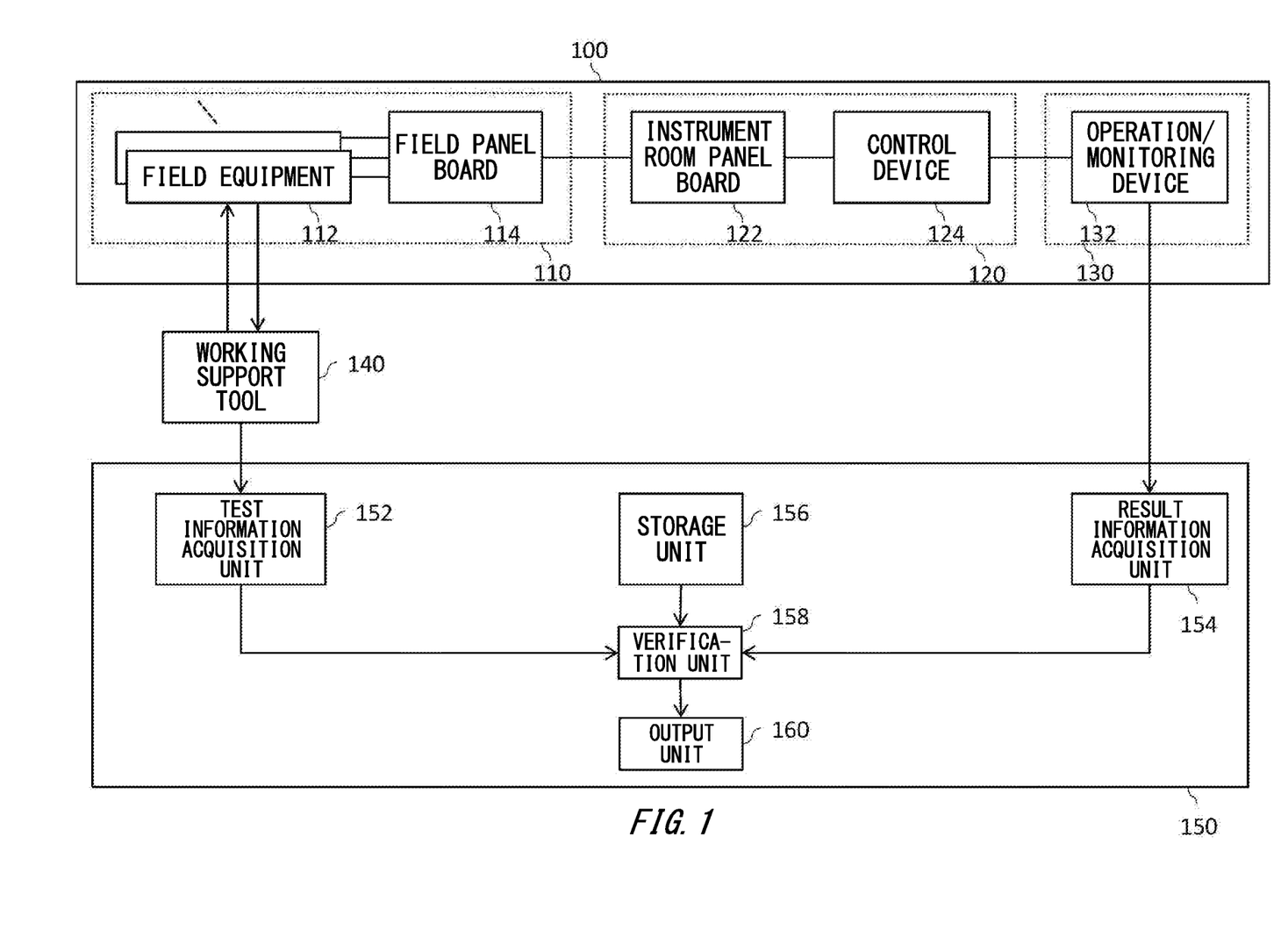
FIG. 1 shows a verification apparatus 150 according to the present embodiment with a plant 100 and a working support tool 140.

FIG. 1 shows the verification apparatus 150 according to the present embodiment with a plant 100 and a working support tool 140. As the plant 100, in addition to industrial plants such as a chemical plant, a plant that manages and controls well sources such as gas fields or oil fields and the surroundings thereof, a plant that manages and controls power generation such as hydropower, thermal power, and nuclear power, a plant that manages and controls power harvesting such as solar light or wind power, a plant that manages and controls water and sewage and dams and the like are exemplified. The verification apparatus 150 performs a loop test, with the assistance of a working support tool 140, during such as construction, operation, and repair of the plant (a complete set of plant facilities) of various fields, to verify whether or not each of the equipment is properly connected from a detection end (for example, a field device) to a manipulation end (for example, a control device or a monitoring device) and is controlled to meet a required specification.

The plant 100 includes a field 110, an instrument room 120, and a monitoring room 130. Also, the instrument room 120 and the monitoring room 130 may be a management room that manages the entire the plant 100.

In the field 110, a field device 112 and a field panel board 114 are installed. The field device 112 is, for example, such as a flow meter, a transmitter of pressure or temperature, level meter, and a pressure sensor, and outputs various signals (for example, an electric signal or signal of such as a measurement value of a measured fluid) to the field panel board 114. A plurality of various kinds of the field device 112 may be installed in the field 110, according to a specification of the plant 100.

The field panel board 114 is, for example, such as a relay terminal board, a relay board, and a converter board. The field panel board 114 is connected to the field device 112, and for example, relays, insulates, branches, and converts a signal output from the field device 112, and outputs the signal to the instrument room 120.

In the instrument room 120, an instrument room panel board 122 and a control device 124 are installed. The instrument room panel board 122 may be such as a similar panel board with the field panel board 114. The instrument room panel board 122 is connected to the field panel board 114, and for example, relays, insulates, branches, and converts the signal output from the field panel board, and outputs the signal to the control device 124.

The control device 124 is such as a DCS (Distributed Control System) for example, and performs various types of control of the plant 100. The control device 124 is connected to the instrument room panel board 122, performs various types of controls or operations for a signal output from the instrument room panel board 122, and delivers the output to the monitoring room 130.

In the monitoring room 130, a manipulation/monitoring device 132 is installed. The manipulation/monitoring device 132 is connected to the control device 124, and displays the output delivered from the control device 124 via a monitor or indicator light. As a result, the worker can monitor the state of the plant 100 from the monitoring room 130 via report or the like thanks to output of the monitor or the indicator light. Furthermore, the manipulation/monitoring device 132 has a manipulation unit such as a touch panel or a manipulation switch, and therefore the worker can remotely control the plant 100 via the manipulation unit of the manipulation/monitoring device 132. Note that the instrument room 120 and the instrument room panel board 122 may not be installed and the output of the field device 112 may be connected to the control device 124.

The working support tool 140 supports the loop test, In addition to adjustment and setting of the flow meter, transmitter, and another field device 112. As one example, the working support tool 140 delivers a signal generating instruction that is an instruction for generating the test signal to the field device 112, and acquires the equipment information for identifying the field device 112 from the field device 112 which has generated the test signal. Moreover, working support tool 140 delivers the test information including the test signal generated by the field device 112 and the equipment information for identifying the field device 112 which has generated the test signal to the verification apparatus 150. In addition, the working support tool 140 may include clock time information or worker information or the like in the test information. The clock time information may be information showing the clock time when the test signal is generated by the field device 112, or the clock time when the field device 112 received the signal generating instruction from the working support tool 140, or the clock time when the working support tool 140 delivered the test information to the verification apparatus 150. By incorporating the clock time information into the test information, the working support tool 140 can enable the verification apparatus 150 to know, on acquisition of the test information, the time point of generating the test signal corresponding to the test result. As a result, the verification apparatus 150 can test, for example, transient response characteristics of the plant 100. Furthermore, the working support tool 140 can cause the verification apparatus 150 which has acquired the test information to recognize the worker when the signal generating instruction is generated toward the verification apparatus 150 by including the worker information to the test information. As a result, the verification apparatus 150 can output the verification result in association with the worker, and thus can even automatically notify the worker of the verification result, for example, when an abnormality is generated in the loop test or the like.

Note that while the present embodiment shows the loop test supported by the working support tool 140 as one example, the loop test may be performed without using the working support tool 140. In other words, for example, the field device 112 may generate the test signal, in response to the manipulation unit installed in the field device 112 having been manipulated by the worker, and may deliver the test information to the verification apparatus 150.

In the present embodiment, the verification apparatus 150 comprises a test information acquisition unit 152, a result information acquisition unit 154, a storing unit 156, and verification unit 158, and an output unit 160. Note that the present embodiment describes the case in which the verification apparatus 150 is a single apparatus independent of other apparatuses as one example. However, the verification apparatus 150, for example, may be achieved as an apparatus integrated to the working support tool 140, and may be achieved to coordinate with the plurality of apparatuses, and also can be achieved on a cloud or a server.

The test information acquisition unit 152 acquires the test information showing the test signal generated from the field device 112 installed in the plant 100. In the present embodiment, the test information acquisition unit 152 acquires the test information including the test signal, the equipment information, the clock time information, and the worker information from the working support tool 140. The test information acquisition unit 152 subsequently delivers the acquired test information to the verification unit 158. Note that the test information acquisition unit 152 may acquire the test information from the working support tool 140 via wired or wireless network, and may acquire the test information by an input from the worker.

The result information acquisition unit 154 acquires the result information showing the test result signal output from the monitor device installed in the plant 100 in response to the test signal being generated by the field device 112. The monitor device herein includes the field panel board 114, the instrument room panel board 122, the control device 124, and the manipulation/monitoring device 132. In the present embodiment, the case in which the result information acquisition unit 154 acquires the result information from the manipulation/monitoring device 132 is described as one example. In this case, the verification apparatus 150 can perform the end-to-end loop test from the field device 112 of the plant 100 to the manipulation/monitoring device 132. However, the result information acquisition unit 154 may acquire the result information from the field panel board 114, the instrument room panel board 122, and the control device 124 in addition to the manipulation/monitoring device 132. In other words, the verification apparatus 150 may perform a loop test for a part of the plant 100. Note that the result information acquisition unit 154 may acquire, by the monitor device, various conditions such as temperature or pressure and such as the signal showing the settings of each boards and each apparatus when the loop test is performed, in addition to the result information of the loop test. Furthermore, similarly to the test information acquisition unit 152, the result information acquisition unit 154 may acquire the result information from the monitor device via the wired or wireless network, and may acquire the result information by an input from the worker. Also, the result information may include the clock time information showing the clock time when the test result signal is acquired by the monitor device, or the clock time when the result information is delivered to the verification apparatus 150 by the monitor device. Note that the result information is not limited to a specific numerical value and may be information related to such as, for example, image, data or indicator light color.

The storing unit 156 stores change characteristic information, showing that what kind of change is performed in the plant 100 to the signal generated by the each field device 112 when the plant 100 is actually operated according to the required specification of the plant 100, for each of the field device 112. For example, the storing unit 156 correspondingly stores the equipment information of the each field device 112, as change characteristic information, information related to functions or conversion of the operation performed on the signal which is generated by the each field device 112 and output from the monitor device before the signal is output from the monitor device when the plant 100 is actually operated according to the required specification of the plant 100. The change characteristic information may be information created by the worker based on the required specification of the plant 100, or may be automatically created based on the simulation result upon construction of the plant 100, for example.

The verification unit 158 verifies, based on the test information and the result information, whether or not a relationship between the test signal and the test result signal is established, the relationship depending on the performed change of the signal that is generated by the field device 112 before the signal is output from the monitor device. Specifically, the verification unit 158 reads the change characteristic information corresponding to the equipment information included in the test information from the storing unit 156, and verifies whether or not a relationship is established between the test signal and the test result signal, the relationship depending on the change corresponding to the equipment information. Such as the worker actually operates the plant 100 after confirming, by the loop test, a change performed on the signal generated by the field device 112 upon actual operating the plant 100. In other words, the verification unit 158, verifies whether or not the test result signal and the test signal are in a relationship in which the same change as the change performed on the signal generated by each field device during the actual operation of the plant 100 is performed, so that the verification unit 158 verifies whether or not the each equipment is properly connected in the plant 100 and whether or not the control to meet the required specification. In this way, the verification unit 158 confirms that no problem occurs upon an actual operating of the plant. The verification unit 158 subsequently delivers the verified result to the output unit 160.

The output unit 160 outputs various information based on the verification result delivered from the verification unit 158.

Figure 2:
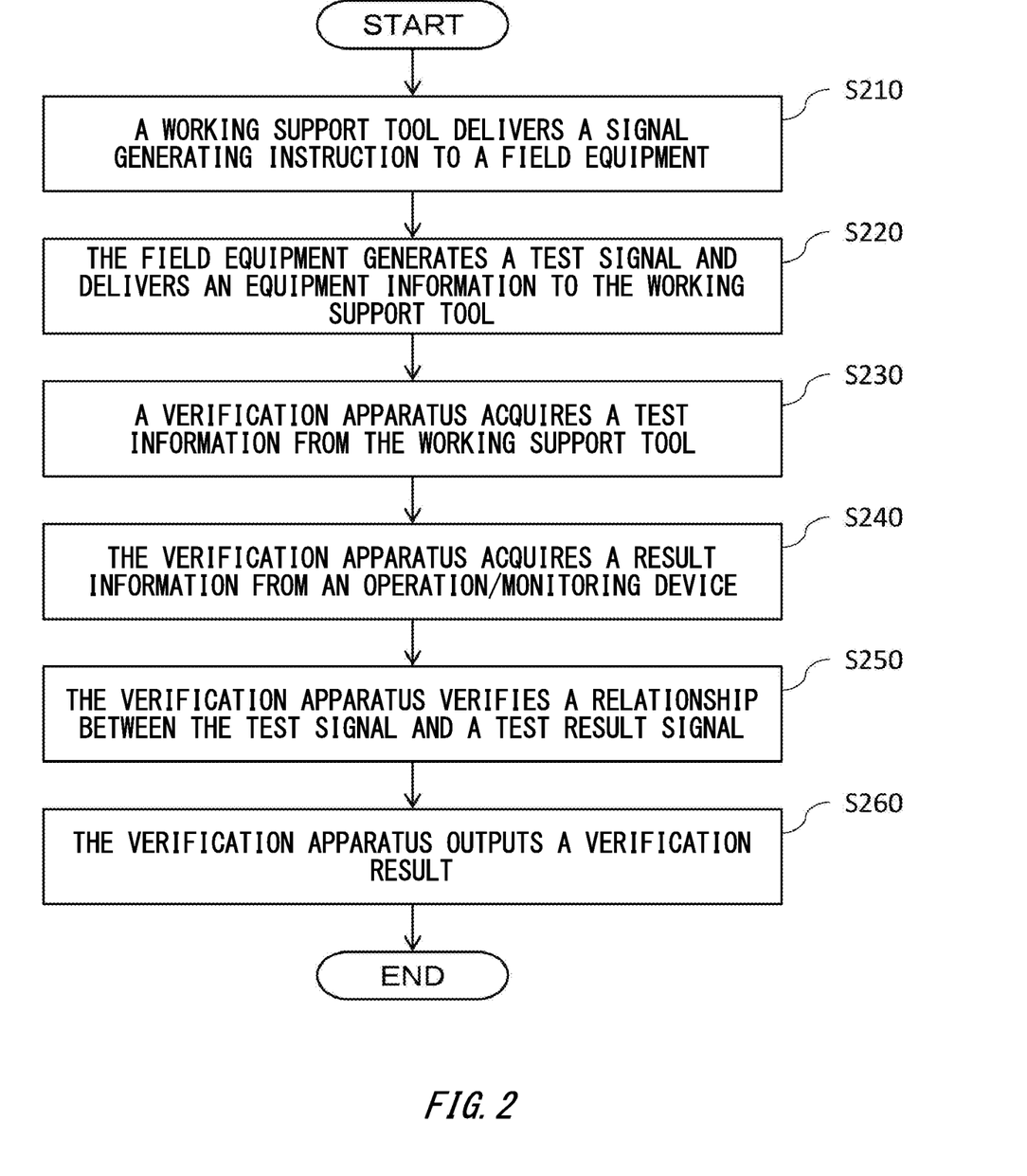
FIG. 2 shows a flow of verification method by using the verification apparatus 150 according to the present embodiment.

FIG. 2 shows a flow of the verification method using the verification apparatus 150 according to the present embodiment. In the flow, as one example, a case in which the control device 124 installed in the plant 100 changes the signal generated by the field device 112 will be described. However, in addition to the control device 124, the field panel board 114 and the instrument room panel board 122 installed in the plant 100 may change the signal generated by the field device 112. Moreover, the field device 112 may generate a signal therein, perform change to the signal therein, and output the signal to outside. Note that when the change is performed inside the field device 112, a signal that is internally generated by the field device 112 and subject to the change therein in response to the signal generating instruction is defined as a test signal. In a step 210, for example, the working support tool 140 delivers a signal generating instruction that is an instruction to generate the test signal in response to a manipulation from a worker A to the field device 112. At this time, the worker A who is manipulating the working support tool 140 communicates that the signal generating instruction is delivered to a worker B who is on the manipulation/monitoring device 132 side. The communication to the worker B may be conveyed by signal via the wired or wireless network, may be verbally conveyed to the worker B by using such as a transceiver by the worker A.

The field device 112, as the signal generating instruction is delivered from the working support tool 140, generates the test signal toward the field panel board 114 and delivers the equipment information to identify itself to the working support tool 140 in a step 220.

The working support tool 140, as the equipment information is delivered from the field device 112, delivers the test information including the test signal, the equipment information, the clock time information, and the worker information to the verification apparatus 150, and the test information acquisition unit 152 of the verification apparatus 150 acquires the test information from the working support tool 140 in a step 230. At this time, the test information acquisition unit 152 may acquire the test information from the working support tool 140 via the wired or wireless network, and for example, may acquire the test information by an input from the worker A.

As the test signal is generated by the field device 112, the control device 124 receives the test signal via the field panel board 114 and instrument room panel board 122. Then the control device 124 performs an operation such as a square root extraction to the test signal for example, and delivers the test signal to the manipulation/monitoring device 132.

Subsequently, in a step 240, the result information acquisition unit 154 of the verification apparatus 150 acquires the result information showing the test result signal on which an operation is performed in the control device 124, from the manipulation/monitoring device 132. At this time, the result information acquisition unit 154 may acquire the result information from the manipulation/monitoring device 132 via the wired or wireless network, and for example, the result information may be acquired by causing the worker A (or another worker) to input the result information conveyed by such as the transceiver to the worker A (or another worker) from the worker B who has seen the display of the manipulation/monitoring device 132 (such as a monitor output, an indicator light, and an image capturing result).

In the step 250, the verification unit 158 of the verification apparatus 150 reads change characteristic information corresponding to the equipment information included in the test information from the storing unit 156, verifies whether or not a relationship is established between the test signal and the test result signal, the relationship depending on a change corresponding to the equipment information, and delivers the verified result to the output unit 160.

Here, the verification unit 158 performs to the test result signal, as one example, an opposite change in the opposite direction to the change corresponding to the change characteristic information having been read from the storing unit 156, and based on the test result signal and the test signal in which the opposite change has performed, and then verifies whether or not a relationship depending on the change between the test signal and the test result signal is established. Alternatively, the verification unit 158 performs to the test signal, a same change that is in the same direction as the change corresponding to the change characteristic information having been read in the storing unit 156, based on the test signal and test result signal on which the same change has performed, may verify whether or not a relationship depending on the change is established between the test signal and the test result signal.

Specifically, when a predetermined operation is performed on the signal that is generated by the field device 112 and output from the monitor device before the signal is output from the monitor device, the verification unit 158 verifies whether or not a relationship depending on a change, based on the test signal, the test result signal, the operation information is established. Also, when an operation based on another signal is performed on the signal that is generated by the field device 112 and output from the monitor device before the signal is output from the monitor device, the verification unit 158 verifies whether or not a relationship depending on a change, based on the test signal, the test result signal, and the another signal is established. Also, the verification unit 158 verifies, when a selection is performed among a plurality of options, based on the signal that is generated by the field device 112 and output from the monitor device before the signal is output from the monitor device, whether or not a relationship depending on a change, based on the test signal, the test result signal, and the information of the selection is established. Details will be described later.

In step 260, the verification apparatus 150 and the output unit 160 output the verification result deliver from the verification unit 158 and complete the processing.

Figure 3:
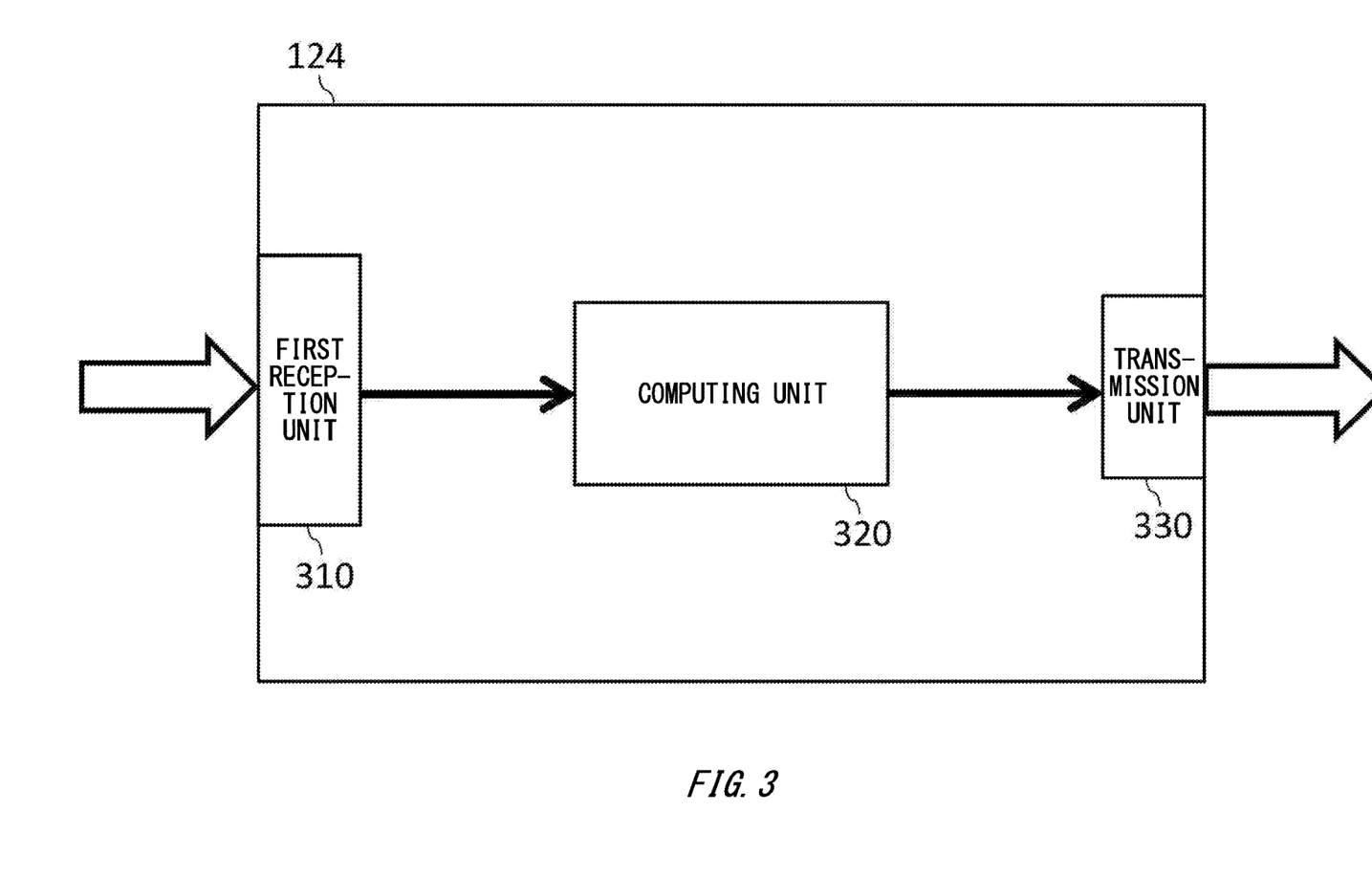
FIG. 3 schematically shows a first example of change performed on a signal generated by a field device 112 in the plant 100.

FIG. 3 schematically shows a first example of a change performed on the signal generated by the field device 112 in the plant 100 according to the present embodiment. In this figure, as one example, a case in which the control device 124 installed in the plant 100 changes the signal generated by the field device 112 will be described. However, in addition to the control device 124, the field panel board 114 and the instrument room panel board 122 installed in the plant 100 may change the signal generated by the field device 112.

In the present embodiment, the control device 124 has a first reception unit 310, a computing unit 320, and a transmission unit 330.

The first reception unit 310 receives the signal generated by the field device 112 via the field panel board 114 and the instrument room panel board 122 and delivers the received signal to the computing unit 320.

The computing unit 320 performs, to the signal received from the first reception unit 310, various predetermined operation, for example, such as square root extraction, range change, and unit system change (a change to non-SI system of units from SI system of units, for example) and delivers the signal on which the operation is performed on the transmission unit 330. Note that the computing unit 320 performs the same processing with the processing which is performed on the signal generated by the each field device 112 when the plant is actually operated, to the test signal generated by the each field device 112 during the loop test.

The transmission unit 330 delivers the signal delivered from the computing unit 320 to the manipulation/monitoring device 132.

Hereinafter, as one example, a case in which an object item of the loop test is a differential pressure flow rate measurement will be described. Depending on a specification upon actual operation of the plant 100, the computing unit 320 converts a differential pressure signal that is generated by the field device 112 into a flow rate and delivers the signal to the manipulation/monitoring device 132, and may be output and displayed in the form of flow rate in the manipulation/monitoring device 132. However, a relationship between the flow rate and the differential pressure is not a linear, but a square characteristic. In other words, the flow rate is in the relationship of multiplying the square root of differential pressure (information of operation) by a coefficient. Therefore, in loop test to the specification of such a plant, when a test signal of differential pressure 50% is generated from the field device 112, for example, a value of about 70% is output on the manipulation/monitoring device 132 as the square root of 50% by going through the computing unit 320. As a result, the test result signal is about 70%, as opposed to 50% for the test signal. In such a state, a skilled worker can accurately determine the pass/fail of the loop test since the skilled worker is understand of the relationship between the differential pressure and the flow rate and a given tolerance for each of the field device 112. However, depending on the worker, since the values of the test signal and the test result signal are different, so those should be determined as pass may be determined as fail, or when the value of 50% output from the manipulation/monitoring device 132 has the same value as the test signal, those should be determined as fail may be determined as pass.

On the other hand, according to the verification apparatus 150 in the present embodiment, the verification unit 158 of the verification apparatus 150 verifies, based on the test information and the result information, whether or not the relationship is established between the test signal and the test result signal, depending on the performed change of the signal that is generated by the field device 112 and output from the plant 100 before the signal is output from the plant 100, and therefore the pass/fail of the loop test can be readily determined with comparative ease without depending to the worker skills, and the specification of the plant can be verified.

For example, in the case where the monitor device outputs the flow rate (0 m$^3$/h~250 m$^3$/h) while the differential pressure signal (0%~100%) from the field device 112, it is assumed that the test result signal of flow rate=is 177 m$^3$/h is obtained when the test signal of differential pressure signal=50% is generated from the field device 112. In this case, the test result signal is (177/250)×100=70.8% as expressed by percentage. The verification apparatus 150 according to the present embodiment performs, to the test result signal, in the verification unit 158, an inverse operation that is in the opposite direction to the operation performed on the computing unit 320. In other words, the verification unit 158 performs an inverse operation that is in the opposite direction to the square root (operation information) on the value of 70.8%, which is the test result signal, i.e. multiple the test result signal by itself. In this way, the verification unit 158 obtains a value of (70.8%)$^2$=50.1% as the test result signal after the inverse operation. The verification unit 158 compares the test signal: 50% with the test result signal: 50.1% which is obtained by the inverse operation, and if the difference between the two values falls within a range of a predetermined tolerance, determines that the relationship is established between the test signal and the test result signal, depending on the performed change of the signal that is generated by the field device 112 and output from the monitor device before the signal is output from the monitor device and then determines the loop test result as normal.

Note that in the above-mentioned description has described that the verification unit 158 is an example to perform the opposite change in the opposite direction with the change performed on the test result signal in the computing unit 320. However, the verification unit 158 may compare the test signal and the test result signal after performing the same change by performing the same change in the same direction as the change performed on the test signal in the computing unit 320. For example, when the above-mentioned loop test result is obtained, the verification unit 158 performs the same operation in the same direction as the operation performed in the computing unit 320 to the value of 50% the test signal, in other words, by taking the square root, a value of SQRT (50%)=70.7% is obtained as a test signal after performing the same operation. The verification unit 158 compares the test signal: 70.7% with the test result signal=70.8% that of after the same operation, and if the difference between the two values falls within a range of a predetermined tolerance, determines that the relationship is established between the test signal and the test result signal, depending on the performed change of the signal that is generated by the field device 112 and output from the monitor device before the signal is output from the monitor device, and may determine that the loop test result is normal. In this manner, according to the verification apparatus 150 in the present embodiment, even if any change is performed on the signal that is generated by the field device 112 and output from the monitor device before the signal is output from the monitor device, the test signal and the test result signal can be readily compared and the pass/fail of the loop test can be determined.

When the verification unit 158 performs the opposite change to the test result signal, whether the change to be performed on the signal generated by the field device 112 when actually operating the plant 100 is correctly performed can verified from the view of the opposite direction to the change. Also, when the verification unit 158 performs the same change to the test signal, the same change as the change performed on the signal generated by the field device 112 with the actual operation of the plant 100 is performed on the test signal, and therefore an error generated between the two signals to be verified can be almost eliminated and verification with high accuracy can be performed.

Figure 4:
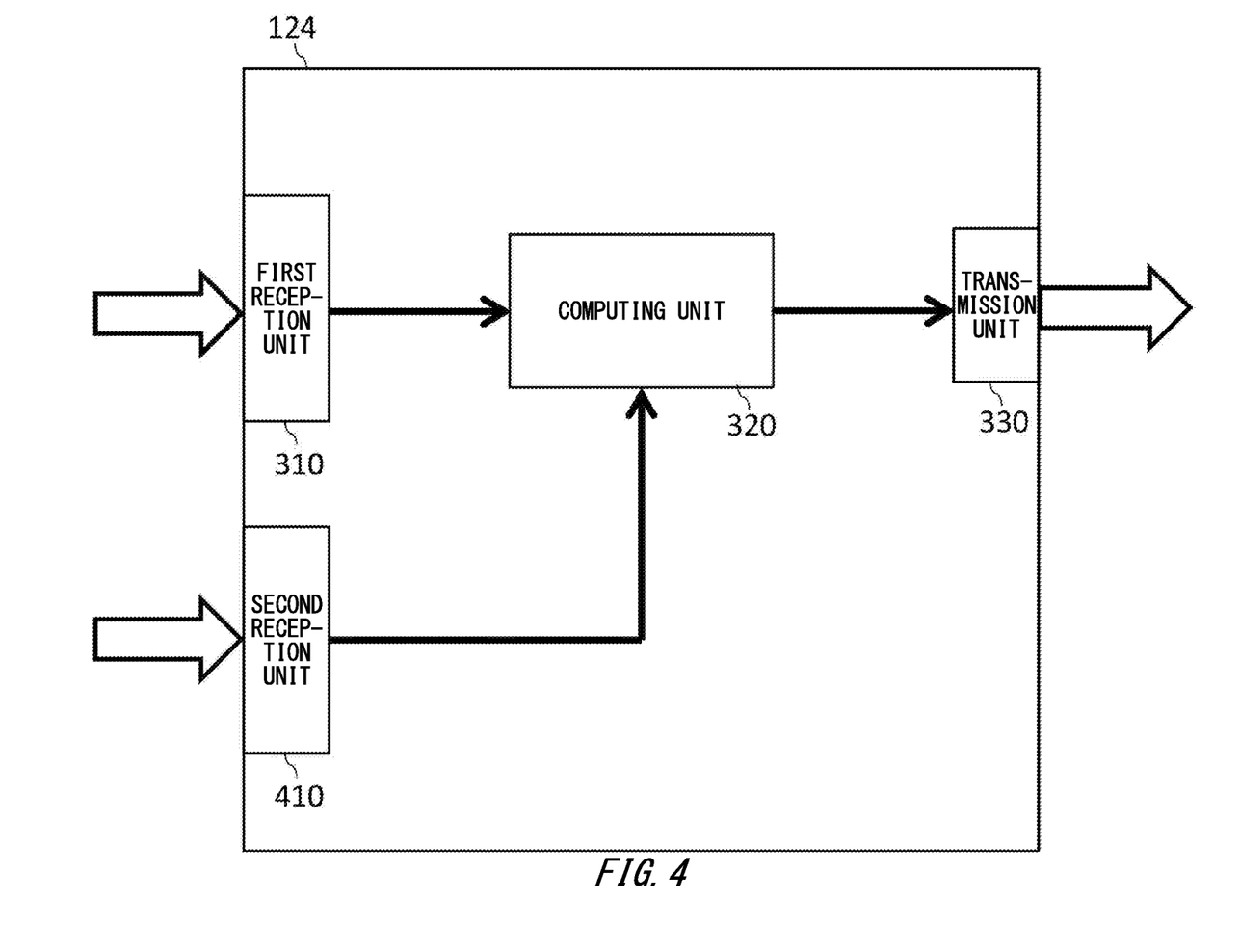
FIG. 4 schematically shows a second example of change performed on a signal generated by the field device 112 in the plant 100.

FIG. 4 schematically shows a second example of change performed on the signal which is generated by the field device 112 in the plant 100. About the portion which is marked with the identical sign with the FIG. 3, a description is omitted since the portion is similar to that of the FIG. 3. A different point from the FIG. 3 is that the control device 124 further has the second reception unit 410.

The second reception unit 410 receives another signal different from the test signal that the first reception unit 310 receives, and delivers the other signal to the computing unit 320. The other signal may be a signal that shows, for example, such as a measurement parameter of temperature or pressure, or such as each setting condition of each board or each apparatus. Also, the another signal may be such as a signal generated by another field device 112 different from the field device 112 which generated the signal received by the first reception unit 310.

In the present embodiment, the computing unit 320 performs operation to the test signal received by the first reception unit 310, based on another signal received by the second reception unit 410.

Hereinafter, as one example, a case in which an object item of the loop test is a gas flow rate measurement will be described. Generally, a capacity of gas is affected by temperature or pressure and the like. Therefore, in the operation of the plant to be performed, the computing unit 320 may multiply the signal (for example, the indicated flow rate) generated from the field device 112 by a conversion factor based on the measurement parameter of such as temperature or pressure and perform a correction operation of such as temperature correction or pressure correction to obtain a true flow rate. In the loop test to the plant being operated in this manner, as the test signal is generated from the field device 112, the worker may not be possible to simply compare the test signal generated by the field device 112 with the test result signal output by the manipulation/monitoring device 132 since the test result signal output by the manipulation/monitoring device 132 becomes a signal after the correction operation by the computing unit 320.

On the other hand, according to the verification apparatus 150 according to the present embodiment, the verification unit 158 of the verification apparatus 150 verifies whether or not a relationship depending on the change is established, based on the another signal such as the temperature information or the pressure information in addition to the test signal and the test result signal. As one example, when the computing unit 320 performs a correction operation to obtain the true flow rate by multiplying the indicated flow rate by the conversion factor, the verification unit 158 calculates the conversion factor by acquiring the measurement parameter of such as the temperature information or the pressure information and performs an inverse operation in the in the opposite direction to the correction operation performed on the test result signal in the computing unit 320, in other words, divides the conversion factor. The verification unit 158 compares the test signal with the test result signal after the inverse operation, and when if the difference between the two values falls within a range of a predetermined tolerance, determines the loop test result as normal. When the inverse operation can be uniquely defined by an inverse function $f^{-1}$ of a function of using the correction operation performed in the computing unit 320, the verification unit 158 may perform the inverse operation using the inverse function $f^{-1}$ to the test result signal.

Note that also in this case, similar to the description of FIG. 3, the verification unit 158 performs the same change in the same direction to the change performed on the test signal in the computing unit 320, and may compare the test signal after performing the same change to the test result signal. In other words, the verification unit 158 calculates the conversion factor by acquiring the measurement parameter such as the temperature information or pressure information, and performs the same operation in the same direction to the correction operation performed on the test signal in the computing unit 320, in other words, multiply the conversion factor. And the verification unit 158 compares the test signal after the same operation to the test result signal, and may determine the loop test result as normal when the difference between the two values falls within a range of a predetermined acceptable range. In this manner, according to the verification apparatus 150 according to the present embodiment, even if any change is performed on the signal generated by the field device 112 and output from the monitor device before the signal is output from the monitor device, the test signal and the test result signal can be readily compared, and the pass/fail of the loop test can be determined.

Figure 5:
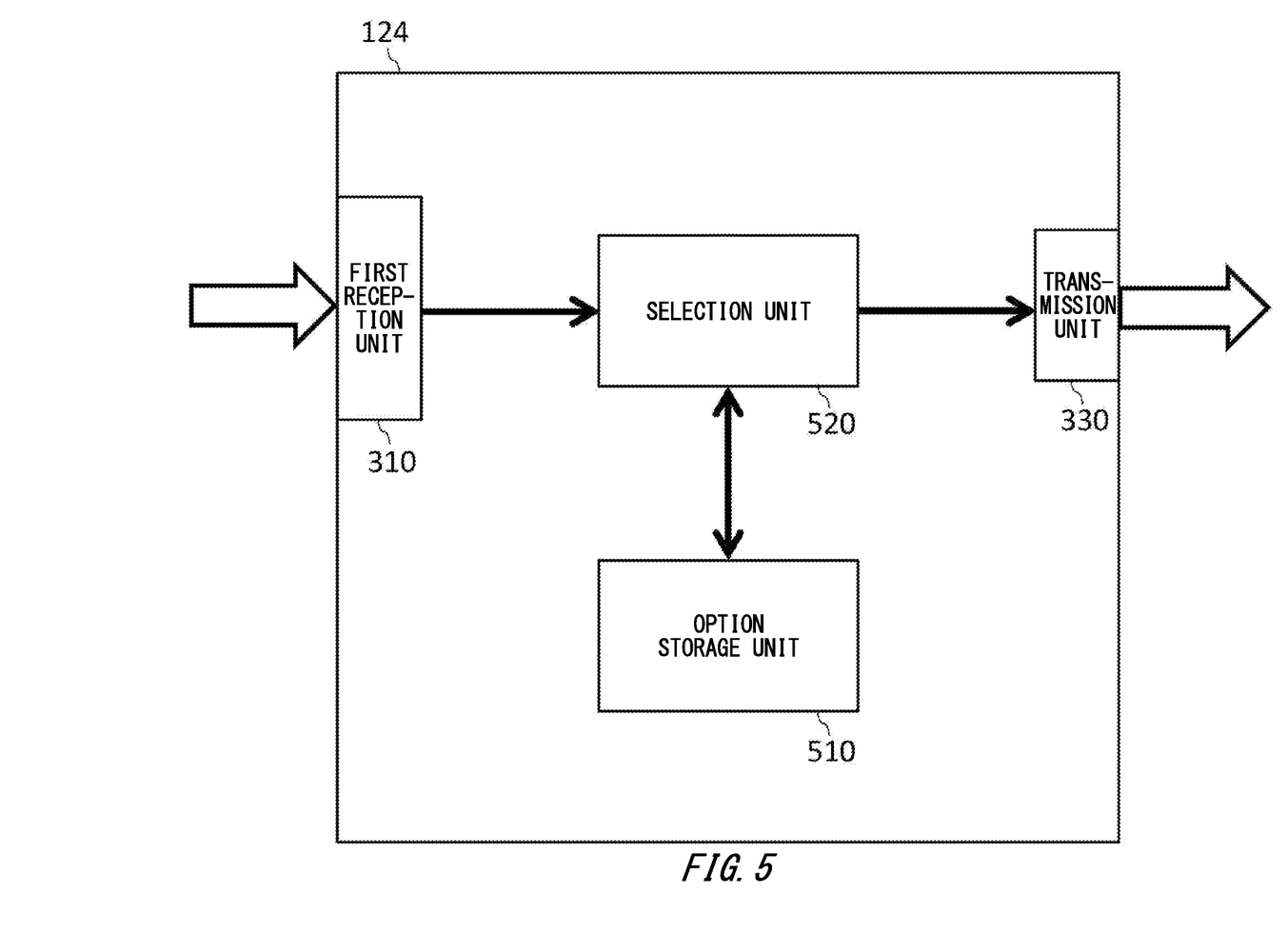
FIG. 5 schematically shows a third example of change performed on a signal that is generated by the field device 112 in the plant 100.

FIG. 5 schematically shows a third example of the change performed on the signal generated by the field device 112 in the plant 100. About the portion which is marked with the identical sign with the FIG. 3, a description is omitted since the portion is similar to that of FIG. 3. A difference from FIG. 3 is that the control device 124 further has an option storage unit 510 and has a selection unit 520 instead of the computing unit 320.

The option storage unit 510 stores a plurality of options selected in response to the signal generated by the field device 112, based on the predetermined criteria.

When the signal generated by the field device 112 is delivered from the first reception unit, the selection unit 520 selects one option among a plurality of options stored in the option storage unit 510, according to the signal generated by the field device 112 based on the predetermined criteria and delivers the one option to the transmission unit 330. Note that the selection unit 520 performs the same selection, based on the test signal generated by each of the field device 112 during the loop test, as the selection performed based on the signal generated by each of the field device 112 when the plant is actually operated.

The verification apparatus 150 stores, in advance, information of the plurality of options stored in the option storage unit 510 and information of the selected criteria into the storing unit 156, and verifies the relationship between the test signal and the test result signal with the verification unit 158 reading the information from the storing unit 156.

As one example, the option storage unit 510 stores two options of "normal" and "abnormal" as the plurality of option, for example. The selection unit 520 in the plant in actual operation selects the option of "abnormal" when the flow rate of the signal generated by the field device 112 is equal to or greater than the threshold value, and selects the option of "normal" when the flow rate of the signal generated by the field device 112 is lesser than the threshold value. In the loop test for the plant being operated in this manner, it is assumed that the test result signal showing "abnormal" is obtained from the control device 124 if the test signal of the first flow rate threshold value) is generated from the field device 112. In this case, the verification unit 158 converts the test result signal showing the "abnormal" into information showing "threshold value" (information showing that equal to or greater than the threshold value) based on the information of the plurality of option information and the selected criteria which are stored in the storing unit 156. Then the loop test is determined as pass when the "first flow rate" shown by the test signal is accordant with the "threshold value" that is a test result signal after conversion (when the first flow rate is equal to or greater than the threshold value). Note that even in this case, similar to the FIG. 3 and FIG. 4, the verification unit 158 performs the opposite change in the opposite direction to the change performed in the selection unit 520 to the test result signal and may obtain, for example, flow rate information that is input into the control device 124 or perform the same change in the same direction to the change performed on the test signal in the selection unit 520 and may obtain, for example, the result selected among the plurality of options.

Also, in the above-mentioned description, the case in which the predetermined plurality of options are stored in the option storage unit 510 is described, the loop test according to the present embodiment may be performed for the loop in which the option storage unit 510 is configured to sequentially update the plurality of options. For example, the option storage unit 510 sequentially stores the signals generated by the field device 112 and can treat the signals as the plurality of options. Then the selection unit 520 may select a maximum value or a minimum value, for example, in a predetermined period among the plurality of options stored in the option storage unit 510. As described above, according to the verification apparatus 150 in the present embodiment, even if any change is performed on the signal that is generated by the field device 112 and output from the monitor device before the signal is output from the monitor device, the test signal and the test result signal can be readily compared, and the pass/fail of the loop test can be determined. Also, according to the verification apparatus 150 in the present embodiment, for the change, based on the various operation or selection described in the FIG. 3, FIG. 4, and FIG. 5, the test signal and the test result signal can be readily compared and the pass/fail of the loop test can be determined.

Various embodiments of the present invention may be described with reference to flowcharts and block diagrams whose blocks may represent (1) steps of processes in which manipulations are performed or (2) sections of apparatuses responsible for performing manipulations. Certain steps and sections may be implemented by dedicated circuitry, programmable circuitry supplied with computer-readable instructions stored on computer-readable media, and/or processors supplied with computer-readable instructions stored on computer-readable media. Dedicated circuitry may include digital and/or analog hardware circuits and may include integrated circuits (IC) and/or discrete circuits. Programmable circuitry may include reconfigurable hardware circuits comprising logical AND, OR, XOR, NAND, NOR, and other logical manipulations, flip-flops, registers, memory elements, etc., such as field-programmable gate arrays (FPGA), programmable logic arrays (PLA), etc.

Computer-readable media may include any tangible device that can store instructions for execution by a suitable device, such that the computer-readable medium having instructions stored therein comprises an article of manufacture including instructions which can be executed to create means for performing manipulations specified in the flowcharts or block diagrams. Examples of computer-readable media may include an electronic storage medium, a magnetic storage medium, an optical storage medium, an electromagnetic storage medium, a semiconductor storage medium, etc. More specific examples of computer-readable media may include a floppy disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disk (DVD), a BLU-RAY® disc, a memory stick, an integrated circuit card, etc.

Computer-readable instructions may include assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, JAVA (registered trademark), C++, etc., and conventional procedural programming languages, such as the "C" programming language or similar programming languages.

Computer-readable instructions may be provided to a processor of a general purpose computer, special purpose computer, or other programmable data processing apparatus, or to programmable circuitry, locally or via a local area network (LAN), wide area network (WAN) such as the Internet, etc., to execute the computer-readable instructions to create means for performing manipulations specified in the flowcharts or block diagrams. Examples of processors include computer processors, processing units, microprocessors, digital signal processors, controllers, microcontrollers, etc.

Figure 6:
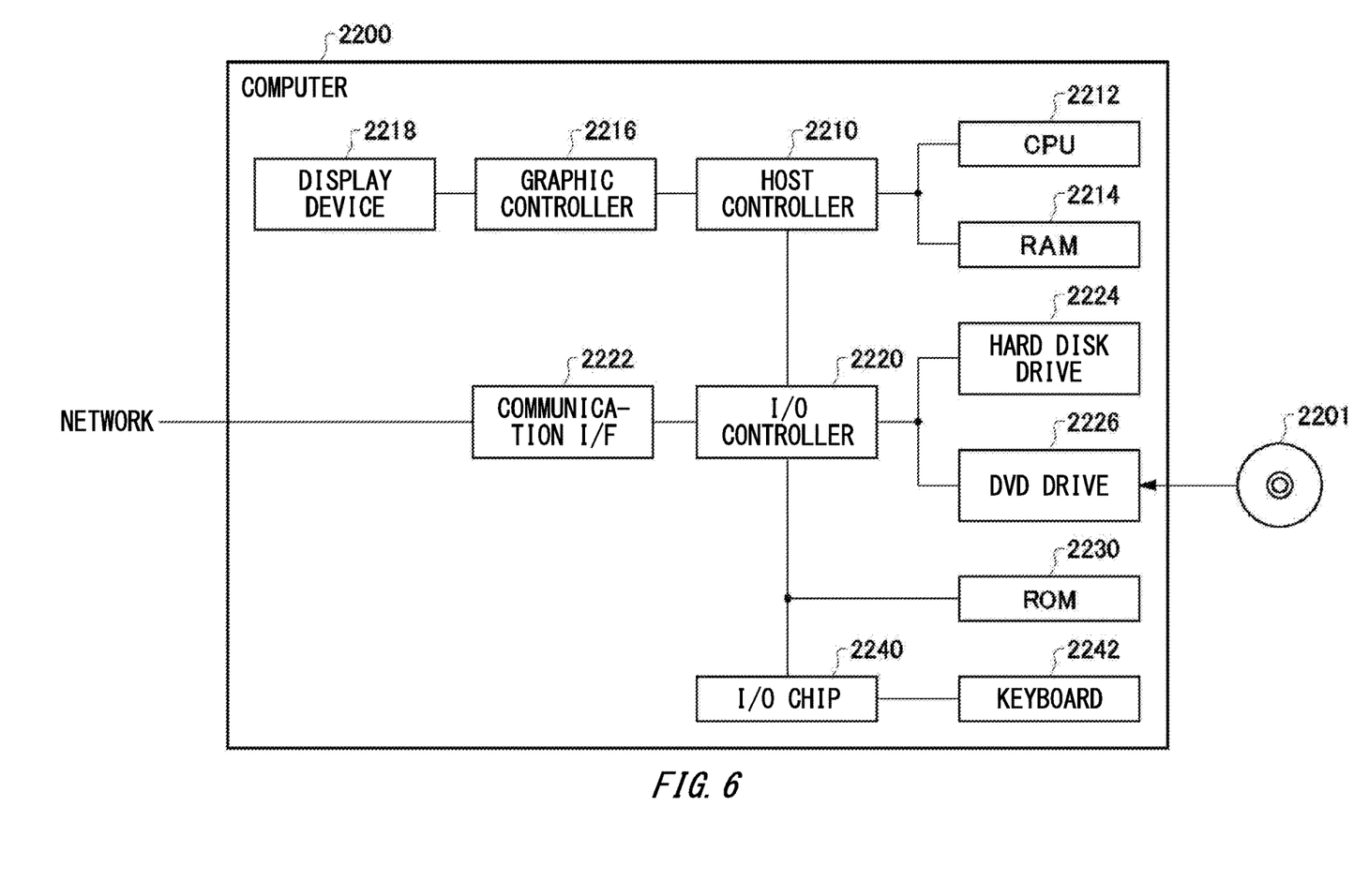
FIG. 6 shows an example of a computer 2200 in which a plurality of aspects in the present invention may entirely or partially embodied.

FIG. 16 shows an example of a computer 2200 in which aspects of the present invention may be wholly or partly embodied. A program that is installed in the computer 2200 can cause the computer 2200 to function as or perform manipulations associated with apparatuses of the embodiments of the present invention or one or more sections thereof, and/or cause the computer 2200 to perform processes of the embodiments of the present invention or steps thereof. Such a program may be executed by the CPU 2212 to cause the computer 2200 to perform certain manipulations associated with some or all of the blocks of flowcharts and block diagrams described herein.

The computer 2200 according to the present embodiment includes a CPU 2212, a RAM 2214, a graphics controller 2216, and a display device 2218, which are mutually connected by a host controller 2210. The computer 2200 also includes input/output units such as a communication interface 2222, a hard disk drive 2224, a DVD-ROM drive 2226 and an IC card drive, which are connected to the host controller 2210 via an input/output controller 2220. The computer also includes legacy input/output units such as a ROM 2230 and a keyboard 2242, which are connected to the input/output controller 2220 through an input/output chip 2240.

The CPU 2212 operates according to programs stored in the ROM 2230 and the RAM 2214, thereby controlling each unit. The graphics controller 2216 obtains image data generated by the CPU 2212 on a frame buffer or the like provided in the RAM 2214 or in itself, and causes the image data to be displayed on the display device 2218.

The communication interface 2222 communicates with other electronic devices via a network. The hard disk drive 2224 stores programs and data used by the CPU 2212 within the computer 2200. The DVD-ROM drive 2226 reads the programs or the data from the DVD-ROM 2201, and provides the hard disk drive 2224 with the programs or the data via the RAM 2214. The IC card drive reads programs and data from an IC card, and/or writes programs and data into the IC card.

The ROM 2230 stores therein a boot program or the like executed by the computer 2200 at the time of activation, and/or a program depending on the hardware of the computer 2200. The input/output chip 2240 may also connect various input/output units via a parallel port, a serial port, a keyboard port, a mouse port, and the like to the input/output controller 2220.

A program is provided by computer readable media such as the DVD-ROM 2201 or the IC card. The program is read from the computer readable media, installed into the hard disk drive 2224, RAM 2214, or ROM 2230, which are also examples of computer readable media, and executed by the CPU 2212. The information processing described in these programs is read into the computer 2200, resulting in cooperation between a program and the above-mentioned various types of hardware resources. An apparatus or method may be constituted by realizing the manipulation or processing of information in accordance with the usage of the computer 2200.

For example, when communication is performed between the computer 2200 and an external device, the CPU 2212 may execute a communication program loaded onto the RAM 2214 to instruct communication processing to the communication interface 2222, based on the processing described in the communication program. The communication interface 2222, under control of the CPU 2212, reads transmission data stored on a transmission buffering region provided in a recording medium such as the RAM 2214, the hard disk drive 2224, the DVD-ROM 2201, or the IC card, and transmits the read transmission data to a network or writes reception data received from a network to a reception buffering region or the like provided on the recording medium.

In addition, the CPU 2212 may cause all or a necessary portion of a file or a database to be read into the RAM 2214, the file or the database having been stored in an external recording medium such as the hard disk drive 2224, the DVD-ROM drive 2226 (DVD-ROM 2201), the IC card, etc., The CPU 2212 may then write back the processed data to the external recording medium.

Various types of information, such as various types of programs, data, tables, and databases, may be stored in the recording medium to undergo information processing. The CPU 2212 may perform various types of processing on the data read from the RAM 2214, which includes various types of manipulations, processing of information, condition judging, conditional branch, unconditional branch, search/replace of information, etc., as described throughout this disclosure and designated by an instruction sequence of programs, and writes the result back to the RAM 2214. In addition, the CPU 2212 may search for information in a file, a database, etc., in the recording medium. For example, when a plurality of entries, each having an attribute value of a first attribute associated with an attribute value of a second attribute, are stored in the recording medium, the CPU 2212 may search for an entry matching the condition whose attribute value of the first attribute is designated, from among the plurality of entries, and read the attribute value of the second attribute stored in the entry, thereby obtaining the attribute value of the second attribute associated with the first attribute satisfying the predetermined condition.

The above-explained program or software modules may be stored in the computer readable media on or near the computer 2200. In addition, a recording medium such as a hard disk or a RAM provided in a server system connected to a dedicated communication network or the Internet can be used as the computer readable media, thereby providing the program to the computer 2200 via the network.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A non-transitory recording medium having a verification program recorded thereon, wherein the verification program which, when executed by a computer, causes the computer to perform operations comprising:
    acquiring test information including a test signal to be generated by a field device that is installed in a plant and field device identification information that uniquely identifies the field device;
    instructing the field device to generate the test signal when the plant is operated;
    acquiring result information including a test result signal output by a monitor device that is installed in the plant, the test result signal being output in response to the field device generating the test signal;
    storing, on a memory, change characteristic information corresponding to the field device, the change characteristic information representing a change that will be performed in the plant to a signal generated by the field device during operation of the plant;
    reading from the memory the change characteristic information corresponding to the field device;
    verifying whether or not the test signal and the test result signal correlate with one another; and
    performing an inverse change that is inverse to the change characteristic information read from the memory on the test result signal, and verifying whether or not test signal and the test result signal having the inverse change performed thereon correlate with one another; or
    performing an identical change that is identical to the change characteristic information read from the memory on the test signal, and verifying whether or not the test signal having the identical change performed thereon and the test result signal correlate with one another.

2. The non-transitory recording medium having the verification program recorded thereon according to claim 1, wherein the verification program causes the computer to further perform operations comprising:
    performing a predetermined operation on the signal that is generated by the field device before the test result signal is output from the monitor device; and
    verifying whether or not the signal that is generated by the field device before the test result signal is output, and the test result signal correlate with one another.

3. The non-transitory recording medium having the verification program recorded thereon according to claim 1, wherein the verification program causes the computer to further perform operations comprising:
    performing an operation based on another signal on the signal that is generated by the field device before the test result signal is output from the monitor device; and
    verifying whether or not the signal that is generated by the field device before the test result signal is output, and the test result signal correlate with one another.

4. The non-transitory recording medium having the verification program recorded thereon according to claim 1, wherein the verification program causes the computer to further perform operations comprising:
    causing a selection to be made before the test result signal is output from the monitor device from among a plurality of options based on the signal that is generated by the field device; and
    verifying whether or not the signal that is generated by the field device, and the test result signal correlate with one another.

5. The non-transitory recording medium having the verification program recorded thereon according to claim 1, wherein
at least one of the test information and the result information includes clock time information.

6. A verification apparatus comprising:
a processor; and
a memory configured to store change characteristic information corresponding to a field device, the change characteristic information representing a change that will be performed in a plant to a signal generated by the field device during operation of the plant,
wherein the processor is configured to
acquire test information including a test signal to be generated by a field device that is installed in the plant and field device identification information that uniquely identifies the field device;
instruct the field device to generate the test signal when the plant is operated;
acquire result information including a test result signal output by a monitor device that is installed in the plant, the test result signal being output in response to the field device generating the test signal;
read from the memory the change characteristic information corresponding to the field device;
verify whether or not the test signal and the test result signal correlate with one another; and
perform an inverse change that is inverse to the change characteristic information read from the memory on the test result signal, and verifying whether or not the test signal and the test result signal having the inverse change performed thereon correlate with one another; or
perform an identical change that is identical to the change characteristic information read from the memory on the test signal, and verifying whether or not the test signal having the identical change performed thereon and the test result signal correlate with one another.

7. A verification method by which a verification apparatus verifies a plant, the verification method comprising:
acquiring, by the verification apparatus, test information including a test signal to be generated by a field device that is installed in the plant and field device identification information that uniquely identifies the field device;
instructing the field device to generate the test signal when the plant is operated;
acquiring, by the verification apparatus, result information including a test result signal output by a monitor device that is installed in the plant, the test result signal being output in response to the field device generating the test signal;
storing, on a memory, change characteristic information corresponding to the field device, the change characteristic information representing a change that will be performed in the plant to a signal generated by the field device during operation of the plant;
reading from the memory the change characteristic information corresponding to the field device;
verifying, by the verification apparatus, whether or not the test signal and the test result signal correlate with one another; and
performing an inverse change that is inverse to the change characteristic information read from the memory on the test result signal, and verifying whether or not the test signal and the test result signal having the inverse change performed thereon correlate with one another; or
performing an identical change that is identical to the change characteristic information read from the memory on the test signal, and verifying whether or not the test signal having the identical change performed thereon and the test result signal correlate with one another.

* * * * *